United States Patent [19]
Ishihara

[11] Patent Number: 5,956,312
[45] Date of Patent: Sep. 21, 1999

[54] PICKUP APPARATUS AND METHOD FOR LASER BEAMS HAVING DIFFERENT WAVELENGTHS

[75] Inventor: Hiroyuki Ishihara, Tokyo, Japan

[73] Assignee: NEC Corporation, Tokyo, Japan

[21] Appl. No.: 08/910,005

[22] Filed: Aug. 12, 1997

[30] Foreign Application Priority Data

Aug. 27, 1996 [JP] Japan .................................. 8-225279

[51] Int. Cl.⁶ ..................................................... G11B 7/00
[52] U.S. Cl. ........................ 369/112; 369/44.37; 369/121
[58] Field of Search ................... 369/112, 120, 369/121, 110, 109, 32, 13, 94, 58, 44.37, 44.23, 44.24

[56] References Cited

U.S. PATENT DOCUMENTS

| | | |
|---|---|---|
| 5,513,164 | 4/1996 | Tanaka et al. . |
| 5,598,394 | 1/1997 | Hibino et al. ............................. 369/112 |
| 5,627,814 | 5/1997 | Lee ............................................ 369/94 |
| 5,633,853 | 5/1997 | Kim et al. ................................ 369/112 |
| 5,636,190 | 6/1997 | Choi ........................................ 369/44.37 |
| 5,673,241 | 9/1997 | Koyama et al. ....................... 369/44.42 |
| 5,682,373 | 10/1997 | Kim ......................................... 369/112 |
| 5,684,781 | 11/1997 | Jeong ....................................... 369/112 |
| 5,696,749 | 12/1997 | Brazas, Jr. et al. ..................... 369/112 |
| 5,703,856 | 12/1997 | Hayashi et al. .......................... 369/112 |
| 5,768,221 | 6/1998 | Kasami et al. ............................ 369/94 |
| 5,777,959 | 7/1998 | Nakagawa et al. ..................... 369/112 |
| 5,787,058 | 7/1998 | Choi ........................................ 369/112 |
| 5,793,732 | 8/1998 | Sabrt et al. .............................. 369/112 |

FOREIGN PATENT DOCUMENTS

| | | |
|---|---|---|
| 0 371 365 A2 | 11/1989 | European Pat. Off. . |
| 0 470 807 A1 | 8/1991 | European Pat. Off. . |
| 62-196880 | 8/1987 | Japan . |
| 62-197931 | 9/1987 | Japan . |
| 340229 | 2/1991 | Japan .................................. 369/112 |
| 3-214102 | 9/1991 | Japan . |
| 5266529 | 10/1993 | Japan .................................. 369/112 |
| 6-333255 | 12/1994 | Japan . |
| 7-37259 | 2/1995 | Japan . |

OTHER PUBLICATIONS

Shunji, O., *Patent Abstracts of Japan*, vol. 013, No. 017, Jan. 17, 1989.
Yoshinao, T., *Patent Abstracts of Japan*, vol. 012, No. 156, May 13, 1988.
Masami, K., *Patent Abstracts of Japan*, vol. 012, No. 363, Sep. 29, 1988.
Tadashi, T., *Patent Abstracts of Japan*, vol. 015, No. 495, Dec. 13, 1991.

*Primary Examiner*—Nabil Hindi
*Attorney, Agent, or Firm*—Whitham, Curtis & Whitham

[57] ABSTRACT

There is provided an optical pick-up apparatus including (a) a plurality of light emitting devices emitting laser beams having different wavelengths, (b) inclined reflective surfaces by the same number as that of the light emitting devices for reflecting the laser beams, (c) the same number of optical systems for image-formation as that of the light emitting devices, each of the optical systems being disposed just above each of the inclined reflective surfaces, each of the optical systems focusing the laser beams reflected at the inclined reflective surfaces on an optical disk medium and transmitting therethrough the laser beams reflected from the optical disk medium, and (d) a light receiving device receivable all of the reflected laser beams. In accordance with the above mentioned optical pick-up apparatus, all laser beams emitted from the light emitting devices and reflected from the optical disc medium are received in the common light receiving device. Hence, all data stored in the laser beams can be processed by a single light receiving device, which ensures the reduction in the number of parts for constituting an optical pick-up apparatus and hence the reduction in fabrication costs. In addition, it is also ensured to fabricate an optical pick-up apparatus in a smaller size.

42 Claims, 6 Drawing Sheets

PICKUP APPARATUS AND METHOD FOR LASER BEAMS HAVING DIFFERENT WAVELENGTHS

BACKGROUND OF THE INVENTION

1. Field of the Invention

The invention relates to an optical pick-up apparatus for recording data into and reproducing data from an optical disc medium such as a laser disc, a compact disc (CD), and a digital video disc (DVD), and also to a method of carrying out optical pick-up.

2. Description of the Related Art

Figure 1:
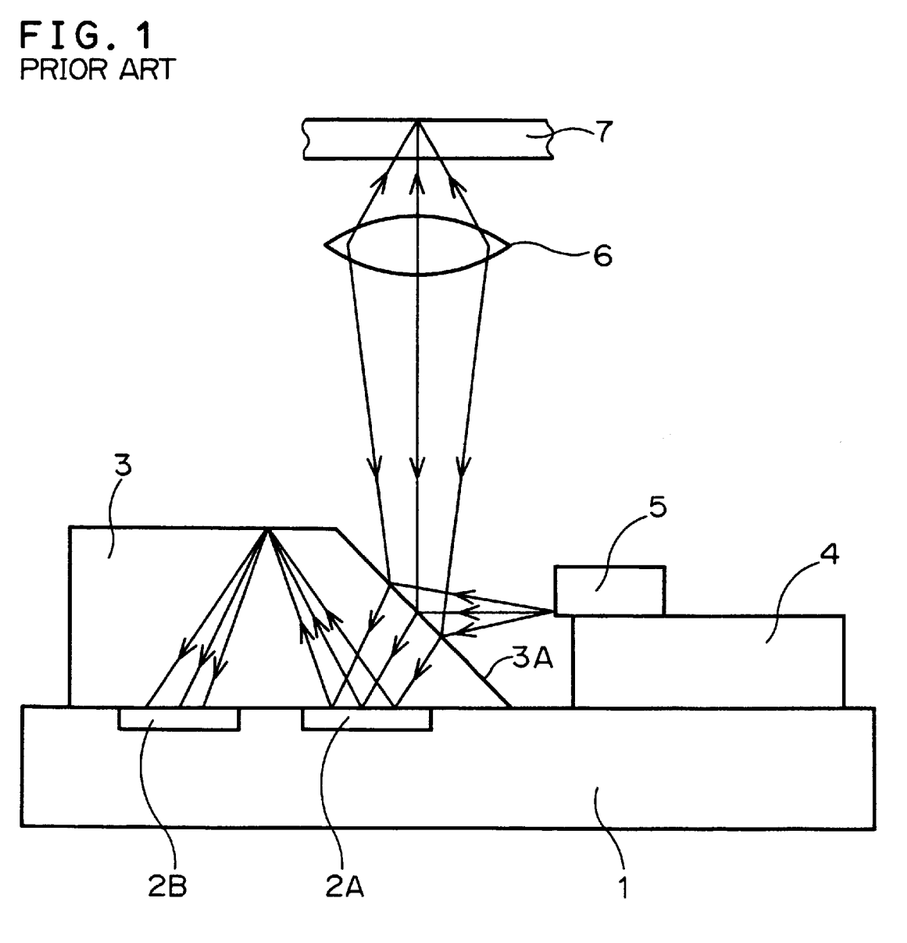
FIG. 1 is a longitudinal cross-sectional view illustrating a conventional optical pick-up apparatus.

FIG. 1 illustrates an example of conventional optical pick-up apparatuses to be used for an optical disc apparatus employing an optical disc medium such as CD and DVD. The illustrated optical pick-up apparatus is one suggested in Japanese Unexamined Patent Publication No. 3-214102. In the illustrated optical pick-up apparatus, there are formed two photo-diodes 2A and 2B and an optical integrated circuit (not illustrated) such as an amplification circuit in an optical integrated circuit 1. A prism 3 is mounted on the substrate 1 at a predetermined location above the photo-diodes 2A and 2B. The prism 3 has an inclined side surface 3A. A heat sink 4 having a photo-diode function is also mounted on the substrate 1, and a semiconductor laser 5 is mounted on the heat sink 4.

The semiconductor laser 5 is disposed in facing relation to the inclined surface 3A of the prism 3. An optical system for image-formation including an objective lens 6 is supported by a support device (not illustrated) just above the inclined surface 3A with an optical axis thereof being perpendicularly directed. The objective lens 6 is disposed in facing relation to a recording surface of an optical disc medium 7.

In operation, a laser beam emitted from a front end surface of the semiconductor laser 5 is reflected at the inclined surface 3A of the prism 3, introduced to the optical disc medium 7 through the objective lens 6, and then focused on the recording surface of the optical disc medium 7 to thereby form an image thereon. The laser beam is reflected at the optical disc medium 7, and establishes an optical signal including information stored in the optical disc medium 7. The thus produced optical signal is introduced into the prism 3 through the objective lens 6 and the inclined surface 3A of the prism 3, and received in the photo-diode 2A. Then, the optical signal is reflected at the photo-diode 2A and further reflected at an inner surface of the prism 3, and then received in the photo-diode 2B.

The optical signals detected in the photo-diodes 2A and 2B are coupled to thereby take out information having been stored in the optical disc medium 7 or establish a servo signal for the optical system to control a position of the objective lens 6 for properly introducing the laser beam onto the optical disc medium 7.

The optical output of the semiconductor laser 5 is controlled by detecting a laser beam emitted from a rear end surface of the semiconductor laser 5 with a photo-diode built in the heat sink 4, and carrying out feedback control utilizing the thus detected laser beam.

The optical pick-up apparatus as mentioned above is used, for instance, for CD and CD-ROM. The semiconductor laser 5 employed in the above mentioned optical pick-up apparatus is, for instance, a near infrared semiconductor laser which emits laser beams having a wavelength of 780 nm band, and is used for any optical disc medium. Hence, it would be possible to keep compatibility for any optical disc mediums having different specification without changing basic optical structure of an optical pick-up apparatus.

In response to a demand of increasing a memory capacity, DVD having a memory capacity of a few giga bytes is now being developed. In this DVD, a semiconductor laser which emits laser beams having a shorter wavelength, for instance, a wavelength of 630 nm band, is used as a light source in order to increase a memory capacity.

One of keys for diffusion of the above mentioned DVD is whether it would be possible to keep compatibility with conventional optical disc mediums. It is not possible to process signals in DVD by a semiconductor laser which is used for CD and emits laser beams having a wavelength of 780 nm band. In contrast, it is not possible to process signals in CD by a semiconductor laser which is used for DVD and emits laser beams having a wavelength of 630 nm. Accordingly, in order to keep compatibility between DVD and conventional mediums such as CD and CD-ROM, it would be necessary to additionally employ a semiconductor laser which emits laser beams having different wavelengths.

However, a wavelength to be used is determined by one semiconductor laser in the above mentioned optical pick-up apparatus, and hence it would be necessary to additionally construct an optical pick-up apparatus including other semiconductor laser or semiconductor lasers, in order to have an optical pick-up apparatus which emits laser beams having different wavelengths. For instance, it would be necessary to mount two different optical pick-up apparatuses on an optical disc apparatus. Accordingly, two sets of elements such as an objective lens and a photo-diode for constituting an optical disc apparatus would be necessary to be prepared, which is accompanied with problems of increased fabrication costs because of an increase in the number of elements, and an increase in size of an optical head.

Japanese Unexamined Patent Publication No. 62-196880 has suggested a semiconductor laser apparatus comprising a photo-detector formed on a semiconductor substrate, a prism fixed on the photo-detector and having a half-transmissive reflective surface and at least one reflective surface, and a semiconductor laser fixed on the semiconductor substrate. A laser beam emitted from the semiconductor laser and reflected at the half-transmissive reflective surface is used as an irradiation beam. A laser beam entering and transmitting through the half-transmissive reflective surface and reflected at the reflective surface is detected by the photo-detector.

Japanese Unexamined Patent Publication No. 62-197931 has suggested a focus detector comprising a semiconductor laser fixed on a semiconductor substrate, a prism fixed on the semiconductor substrate, a first half-transmissive reflective surface formed in a surface of the prism which faces the semiconductor laser, a second half-transmissive reflective surface of the prism which makes abutment with the semiconductor substrate and to which a laser beam having been transmitted through the first half-transmissive reflective surface is introduced, a first photo-detector including three photo-detecting sections arranged in a certain direction, the first photo-detector making facing relation with the second half-transmissive reflective surface, and a second photo-detector including three photo-detecting sections arranged in a certain direction, the laser beam reflected from the second half-transmissive reflective surface entering the second photo-detector. An optically recording medium is irradiated by the laser beam emitted from the semiconductor laser and reflected from the first half-transmissive reflective surface. The laser beam reflected from the optically recording medium and transmitting through the first half-transmissive reflective surface is focused after having been reflected at the second half-transmissive reflective surface but before entering the second photo-detector. A focus error signal of the optically recording medium can be obtained by comparing a first sum to a second sum wherein the first sum is a sum of detecting signals emitted from the photo-detecting sections disposed at opposite ends in the first photo-detector and a detecting signal emitted from the photo-detecting section disposed at the center in the second photo-detector, and wherein the second sum is a sum of a detecting signal emitted from the photo-detecting section disposed at the center in the first photo-detector and detecting signals emitted from the photo-detecting sections disposed at opposite ends in the second photo-detector.

Those apparatuses suggested in the above mentioned Japanese Unexamined Patent Publications have the same problems as those of the optical pick-up apparatus having been explained with reference to FIG. 1.

SUMMARY OF THE INVENTION

In view of the foregoing problems of the conventional optical pick-up apparatuses, it is an object of the present invention to provide an optical pick-up apparatus which is capable of sharing parts between semiconductor lasers which emit laser beams having different wavelengths, to thereby fabricate an optical pick-up apparatus at lower costs and in a smaller size. It is also an object of the present invention to provide a method of fabricating such an optical pick-up apparatus.

In one aspect, there is provided an optical pick-up apparatus including (a) a plurality of light emitting devices emitting laser beams having different wavelengths, (b) inclined reflective surfaces by the same number as that of the light emitting devices for reflecting the laser beams, (c) the same number of optical systems for image-formation as that of the light emitting devices, each of the optical systems being disposed just above each of the inclined reflective surfaces, each of the optical systems focusing the laser beams reflected at the inclined reflective surfaces on an optical disk medium and transmitting therethrough the laser beams reflected from the optical disk medium, and (d) at least one light receiving device receivable all of the laser beams reflected from the optical disk medium and transmitting through both the optical systems and the inclined reflective surfaces.

The desired number of the light emitting devices may be provided. For instance, the optical pick-up apparatus may include two light emitting devices. The inclined reflective surfaces may have any degrees inclination, however, a preferable degree is 45 degrees.

The inclined reflective surfaces may be formed separately. However, it is preferable they are integrally formed in a single prism, in which case the prism may have a trapezoidal longitudinal cross-section.

The optical pick-up apparatus may have first and second light receiving devices, in which case the first light receiving device receives laser beams transmitting through the inclined reflective surfaces, and the second light receiving device receives laser beams reflected from the first light receiving device and further reflected at a top inner surface of the prism.

It is preferable that one of the light emitting devices emits laser beam having a wavelength for a digital video disc and another one of the light emitting devices emits laser beam having a wavelength for a disc other than a digital video disc.

There is further provided an optical pick-up apparatus including (a) an optical integrated circuit substrate, (b) at least one photo-diode formed at a surface of the substrate, (c) a prism mounted on the substrate above the photo-diode, the prism having a plurality of inclined reflective surfaces, (d) semiconductor laser beam emitting devices by the same number of that of the inclined reflective surfaces, the semiconductor laser beam emitting devices emitting laser beams having different wavelengths and being disposed in facing relation with the inclined reflective surfaces, and (e) optical systems for image-formation by the same number of that of the inclined reflective surfaces, disposed above the inclined reflective surfaces. Laser beams emitted from the semiconductor laser beam emitting devices are reflected at the inclined reflective surfaces of the prism and focused on an optical disc medium by the optical systems, and laser beams reflected from the optical disc medium transmit through the optical systems, enter the prism through the inclined reflective surfaces, and are received in the photo-diode.

There is still further provided an optical pick-up apparatus including (a) an optical integrated circuit substrate, (b) at least one light receiving device formed at a surface of the substrate, (c) a prism mounted on the substrate above the light receiving device, the prism having a plurality of inclined reflective surfaces and having a central axis about which the inclined reflective surfaces are disposed in symmetry, (d) semiconductor laser beam emitting devices by the same number of that of the inclined reflective surfaces, the semiconductor laser beam emitting devices emitting laser beams having different wavelengths and being disposed in facing relation with the inclined reflective surfaces, (e) a single optical system for image-formation disposed above one of the inclined reflective surfaces, and (f) a device for varying the light receiving device, the prism and the semiconductor laser beam emitting devices in position relative to the optical system so that the laser beams reflected at the inclined reflective surfaces are directed toward the single optical system. In the optical pick-up apparatus, the laser beams emitted from the semiconductor laser beam emitting devices are reflected at the inclined reflective surfaces of the prism and focused on an optical disc medium by the optical system, and the laser beams reflected from the optical disc medium transmit through the optical system, enter the prism through the inclined reflective surfaces, and are received in the light receiving device.

Specifically, the above mentioned device for varying the position may be a device for rotating either the light receiving device, the prism and the semiconductor laser beam emitting devices, or the optical system relative to each other. For instance, the optical integrated circuit substrate on which the light receiving device, the prism and the semiconductor laser beam emitting devices are mounted may be designed to be rotatable about the central axis of the prism. As an alternative, the optical system may be designed to be able to revolve round the central axis of the prism.

There is yet further provided an optical pick-up apparatus including (a) a plurality of light emitting devices emitting laser beams having different wavelengths, (b) inclined reflective surfaces by the same number as that of the light emitting devices for reflecting the laser beams, (c) a single optical system for image-formation disposed above one of the inclined reflective surfaces, the optical system focusing the laser beams reflected from the inclined reflective surfaces on an optical disk medium and transmitting therethrough the laser beams reflected from the optical disk medium, (d) at least one light receiving device receivable all of the laser beams reflected from the optical disk medium and transmitting through both the optical system and the inclined reflective surfaces, and (e) a device for varying the light emitting device, the inclined reflective surfaces and the light receiving device in position relative to the optical system so that the laser beams reflected at the inclined reflective surfaces are directed toward the single optical system.

In another aspect, there is provided a method of optical pick-up, including the steps of (a) emitting a laser beam from a light emitting device, (b) forming an image on an optical disc medium by reflecting the laser beam at a reflective surface, (c) receiving the laser beam reflected from the optical disc medium at at least one common light receiving device, and (d) repeating the steps (a) to (c) wherein laser beams are emitted from different light emitting devices, have different wavelengths, and are reflected at different reflective surfaces.

There is further provided a method of optical pick-up, including the steps of (a) emitting a laser beam from a light emitting device, (b) forming an image on an optical disc medium by reflecting the laser beam at a reflective surface and transmitting the laser beam through an optical system for image-formation, (c) receiving the laser beam reflected from the optical disc medium at at least one common light receiving device, (d) varying a positional relationship among the light emitting device, the reflective surface, the light receiving device and the optical system so that a set of another light emitting device, reflective surface and light receiving device is associated with the optical system, and (e) repeating the steps (a) to (d) wherein laser beams are emitted from different light emitting devices, have different wavelengths, and are reflected at different reflective surfaces.

The positional relationship may be varied in the step (d), for instance, by rotating the light emitting device, the reflective surface and the light receiving device, and the optical system relative to each other. The light emitting device, the reflective surface and the light receiving device may be rotated in the step (d) about a central axis of the different reflective surfaces. As an alternative, the optical system may be designed to revolve round a central axis of the different reflective surfaces in the step (d).

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 2:
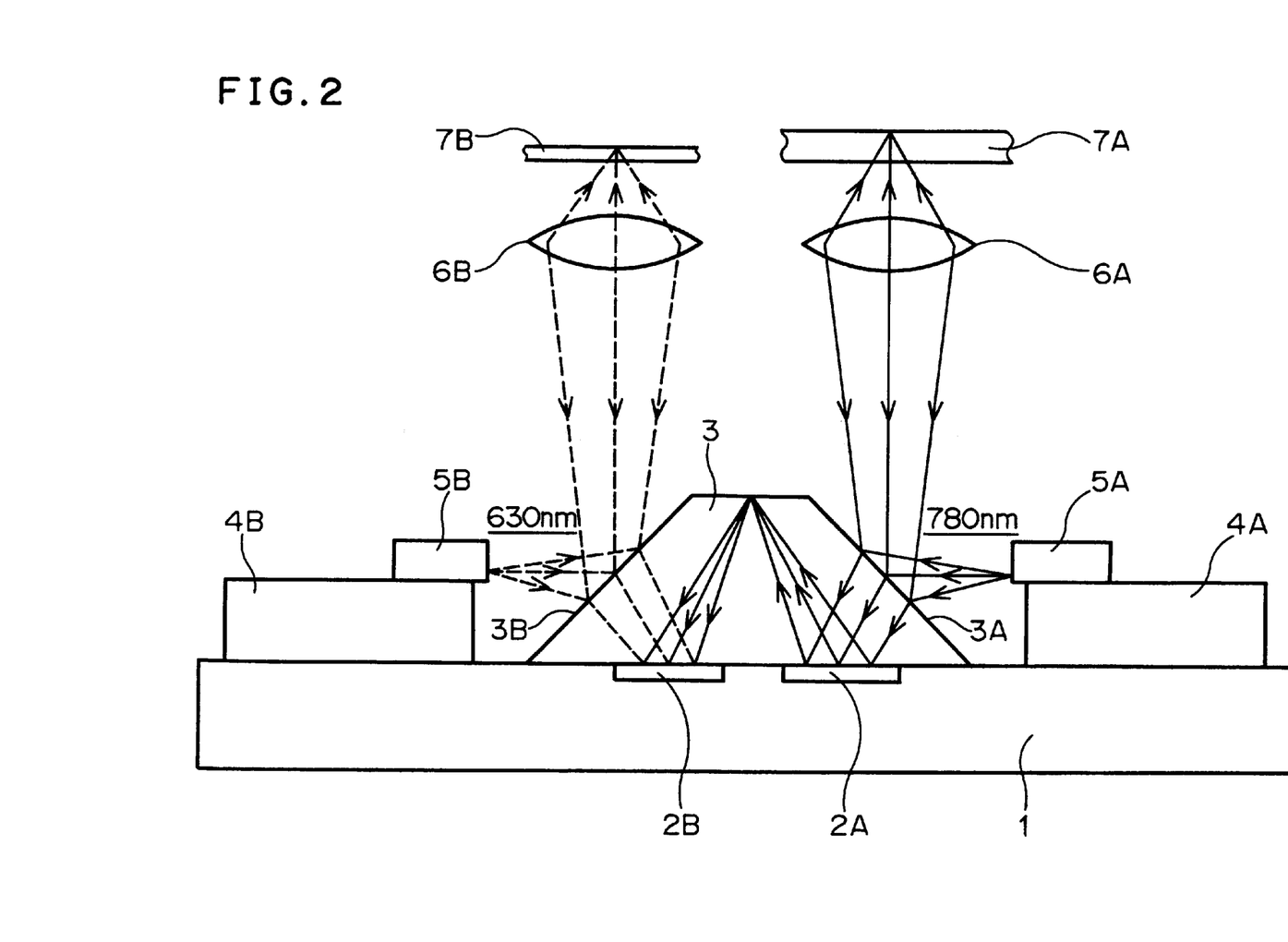
FIG. 2 is a longitudinal cross-sectional view illustrating an optical pick-up apparatus in accordance with the first embodiment of the present invention.

FIG. 2 illustrates an optical pick-up apparatus in accordance with the first embodiment. An optical integrated circuit 1 is formed with two photo-diodes 2A and 2B and an optical integrated circuit (not illustrated) such as an amplification circuit. A prism 3 is mounted on the substrate 1 above the photo-diodes 2A and 2B. The prism 3 has inclined side surfaces 3A and 3B in the same direction as a direction in which the photo-diodes 2A and 2B are arranged. The inclined side surfaces 3A and 3B have about 45 degrees inclination relative to a horizontal plane. The inclinations of the inclined side surfaces 3A and 3B are opposite to each other. Thus, the inclined side surfaces 3A and 3B cause the prism 3 to have a trapezoidal cross-section.

Heat sinks 4A and 4B having a photo-diode function are mounted on the substrate 1 in facing relation to the inclined side surfaces 3A and 3B of the prism 3, respectively. On the heat sinks 4A and 4B are mounted semiconductor lasers 5A and 5B which emit laser beams having different wavelengths. In the instant embodiment, the semiconductor laser 5A is designed to emit laser beams having a wavelength of 780 nm band, whereas the semiconductor laser 5B is designed to emit laser beams having a wavelength of 630 nm band. The semiconductor lasers 5A and 5B are positioned in such a manner that surfaces from which laser beams are emitted face the inclined side surfaces 3A and 3B.

Optical systems for image-formation including objective lenses 6A and 6B are supported by a support (not illustrated) just above the inclined side surfaces 3A and 3B with an optical axis thereof being perpendicularly directed. The objective lenses 6A and 6B are disposed in facing relation to recording surfaces of optical disc mediums 7A and 7B, respectively.

In operation, the laser beam having a wavelength of 780 nm band, emitted from a front end surface of the semiconductor laser 5A is reflected at the inclined side surface 3A of the prism 3, passes through the objective lens 6A, and is focused on the recording surface of the optical disc medium 7A which is a conventional disc such as CD and CD-ROM. The laser beam is reflected from the optical disc medium 7A as an optical signal including information having been stored in the optical disc medium 7A. The thus produced optical signal passes through the objective lens 6A in a reverse direction and is introduced into the prism 3 through the inclined side surface 3A. In the prism 3, the optical signal is received in the photo-diode 2A, and then, is reflected at the photo-diode 2A. The optical signal reflected from the photo-diode 2A is further reflected at a top inner surface of the prism 3, and received in the photo-diode 2B.

The optical signals thus detected in the photo-diodes 2A and 2B are coupled to thereby take out information having been stored in the optical disc medium 7A or establish a servo signal for the optical system to control focusing or tracking of the objective lens 6A.

When DVD is used as the optical disc medium 7B, a laser beam having a wavelength of 630 nm band is emitted from a front end surface of the semiconductor laser 5B. The thus emitted laser beam is reflected at the inclined side surface 3B of the prism 3, passes through the objective lens 6B, and is focused on the recording surface of the optical disc medium 7B which is DVD in the instant embodiment. The laser beam is reflected from the optical disc medium 7B as an optical signal including information having been stored in the optical disc medium 7B. The thus produced optical signal passes again through the objective lens 6B in a reverse direction and is introduced into the prism 3 through the inclined side surface 3B. In the prism 3, the optical signal is received in the photo-diode 2B, and then is reflected at the photo-diode 2B. The optical signal reflected from the photo-diode 2B is further reflected at a top inner surface of the prism 3, and received in the photo-diode 2A. Similarly to the previously mentioned case, the optical signals thus detected in the photo-diodes 2A and 2B are coupled to thereby take out information having been stored in the optical disc medium 7B or establish a servo signal for the optical system to control focusing or tracking of the objective lens 6B.

The optical outputs of the semiconductor lasers 5A and 5B are controlled by detecting laser beams emitted from rear end surfaces of the semiconductor lasers 5A and 5B with photo-diodes built in the heat sinks 4A and 4B, and carrying out feedback control utilizing the thus detected laser beams.

In the optical pick-up apparatus in accordance with the above mentioned embodiment, either the optical disc medium 7A such as CD or the optical disc medium 7B such as DVD can be read, and it is impossible to read out both the optical disc mediums 7A and 7B at the same time. Thus, the semiconductor lasers 5A and 5B do not operate at the same time. As a result, the laser beams emitted from the semiconductor lasers 5A and 5B do not interfere with each other.

However, there is a possibility that the laser beam emitted from the semiconductor laser 5A or 5B, then reflected from the optical disc medium 7A or 7B, and then introduced to the photo-diode 2A or 2B through the inclined side surface 3A or 3B may leave the prism 3 through the opposite inclined side surface 3B or 3A, respectively. However, the laser beam emitted from the semiconductor laser 5A or 5B and leaving the prism 3 through the opposite inclined side surface 3B or 3A is quite small in amount because of the following reasons: a laser beam introduced into the prism 3 is small in amount because of a small efficiency of the optical system for image-formation; a laser beam is attenuated while reflected in the prism 3; and a laser beam in the prism 3 is once collected at a top inner surface of the prism 3, and then diffused. Hence, the optical pick-up apparatus is not interrupted from properly operating, even if a laser beam emitted from the semiconductor laser 5A or 5B leaves the prism 3 through the opposite inclined side surface 3B and 3A.

Thus, the optical pick-up apparatus in accordance with the instant embodiment includes two optical pick-up units for recording data into and reproducing data from the two optical disc mediums 7A and 7B by utilizing the two laser beams having different wavelengths, which are 780 nm band and 630 nm band in the instant embodiment. One of the optical pick-up units is comprised of the photo-diodes 2A and 2B, the prism 3, the heat sink 4A, the semiconductor laser 5A, and the optical system for image-formation including the objective lens 6A, and the other is comprised of the photo-diodes 2A and 2B, the prism 3, the heat sink 4B, the semiconductor laser 5B, and the optical system for image-formation including the objective lens 6B. As will be obvious, the prism 3 and the photo-diodes 2A and 2B are shared by the two optical pick-up units, which makes it possible to reduce parts in number, simplify an optical pick-up apparatus in structure, and fabricate an optical pick-up apparatus in a smaller size, comparing to a case wherein two optical pick-up apparatuses have to be fabricated separately.

Figure 3:
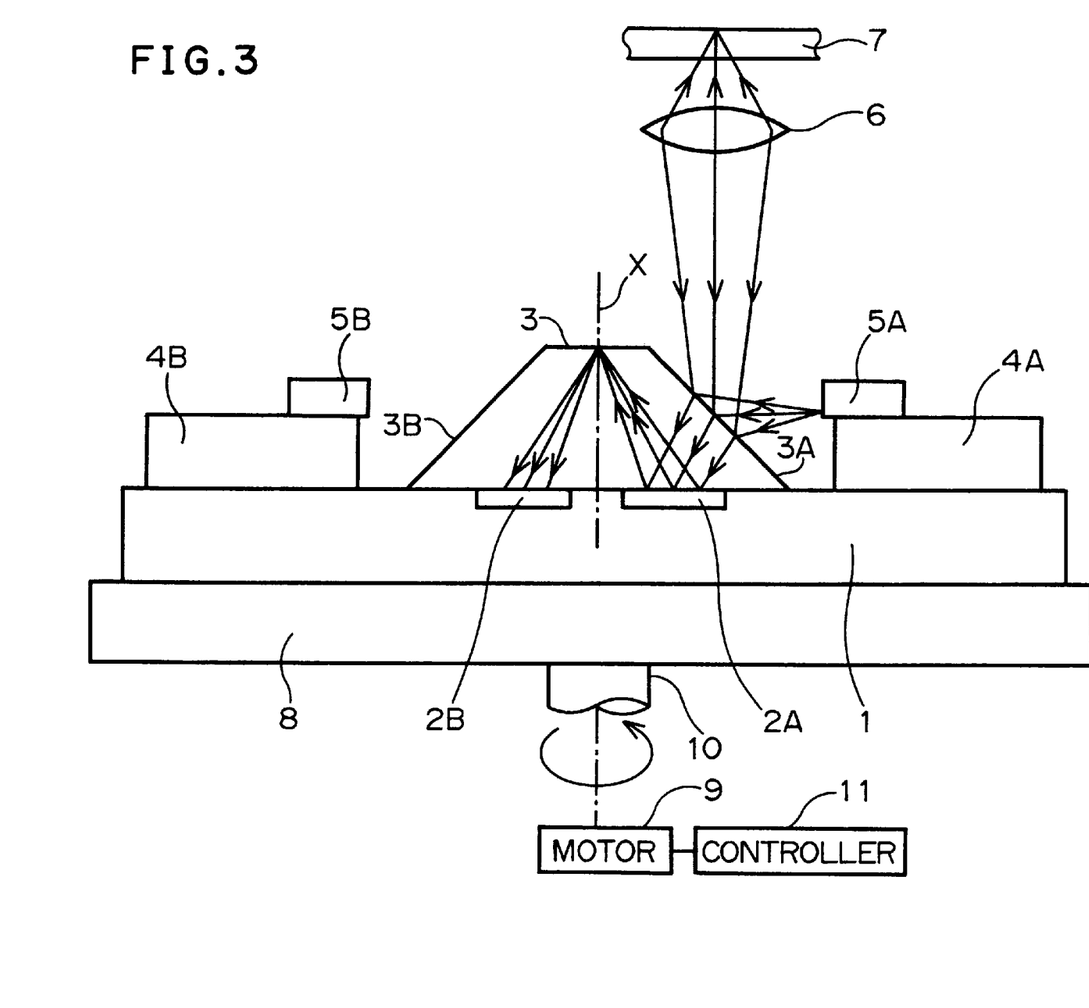
FIG. 3 is a longitudinal cross-sectional view illustrating an optical pick-up apparatus in accordance with the second embodiment of the present invention.

FIG. 3 illustrates an optical pick-up apparatus in accordance with the second embodiment of the present invention. In the first embodiment, the prism 3 and the photo-diodes 2A, 2B are shared by the two optical pick-up units each of which includes the semiconductor laser 5A and 5B, respectively. In the second embodiment, the objective lens as well as the prism and the photo-diodes are shared by the two optical pick-up units.

An optical integrated circuit 1 is formed with two photo-diodes 2A and 2B and an optical integrated circuit (not illustrated) such as an amplification circuit. A prism 3 is mounted on the substrate 1 above the photo-diodes 2A and 2B. The prism 3 has inclined side surfaces 3A and 3B in the same direction as a direction in which the photo-diodes 2A and 2B are arranged. The inclined side surfaces 3A and 3B have about 45 degrees inclination relative to a horizontal plane. The inclinations of the inclined side surfaces 3A and 3B are opposite to each other.

Heat sinks 4A and 4B having a photo-diode function are mounted on the substrate 1 in facing relation to the inclined side surfaces 3A and 3B of the prism 3, respectively. On the heat sinks 4A and 4B are mounted semiconductor lasers 5A and 5B which emit laser beams having different wavelengths, specifically wavelengths of 780 nm band and 630 nm band, respectively. The semiconductor lasers 5A and 5B are positioned so that front end surfaces from which laser beams are emitted face the inclined side surfaces 3A and 3B.

Optical systems for image-formation including objective lens 6 is supported just above the inclined side surface 3A with an optical axis thereof being perpendicularly directed. The objective lens 6 is disposed in facing relation to recording surface of an optical disc medium 7.

In the instant embodiment, the substrate 1 is mounted on a rotatable table 8. The table 8 is connected to a motor 9 through a shaft 10, and is rotated by the motor 9 about a central axis X of the prism 3. A controller 11 is electrically connected to the motor 9, and controls the motor 9 so that the table 8 is rotated by a desired rotation angle and hence one of the inclined side surfaces 3A and 3B of the prism 3 stops just below the objective lens 6 of the optical system.

In operation, the semiconductor laser 5A emits a laser beam having a wavelength of 780 nm band. The thus emitted laser beam is reflected at the inclined side surface 3A, passes through the objective lens 6, focused on the recording surface of the optical disc medium 7, reflected at the optical disc medium 7, passes again through the objective lens 6, enters the prism through the inclined side surface 3A, received in the photo-diode 2A, reflected at the photo-diode 2A, reflected at a top inner surface of the prism 3, and then received in the photo-diode 2B. Similarly to the first and second embodiments, the laser beam detected by the photo-diodes 2A and 2B are coupled to thereby take out information having been stored in the optical disc medium 7.

Then, the controller 11 drives the motor 9 to thereby rotate the table 8 by 180 degrees so that the inclined side surface 3B is disposed just below the objective lens 6 of the optical system. Then, the semiconductor laser 5B emits a laser beam having a wavelength of 630 nm band. The thus emitted laser beam is reflected at the inclined side surface 3B, passes through the objective lens 6, focused on the recording surface of the optical disc medium 7, reflected at the optical disc medium 7, passes again through the objective lens 6, enters the prism through the inclined side surface 3B, received in the photo-diode 2B, reflected at the photo-diode 2B, reflected at a top inner surface of the prism 3, and then received in the photo-diode 2A.

As explained above, the second embodiment makes it possible to focus the laser beams emitted from both the semiconductor lasers 5A and 5B on the optical disc medium 7 by means of the common objective lens 6. That is, in accordance with the instant embodiment, the laser beams having different wavelengths can be focused on an optical disc medium to thereby form an image by the use of the single objective lens 6. Thus, in accordance with the second embodiment, the objective lens 6 can be further shared by the two optical pick-up units including the semiconductor lasers 5A and 5B in comparison with the first embodiment illustrated in FIG. 2 in which the prism 3 and the photo-diodes 2A and 2B are shared. The optical pick-up apparatus in accordance with the second embodiment can be fabricated in simpler structure than the optical pick-up apparatus in accordance with the first embodiment.

In the above mentioned second embodiment, the table 8 on which the prism 3, the photo-diodes 2A and 2B, and the semiconductor lasers 5A and 5B are mounted is rotated about the axis X with the optical system including the objective lens 6 being kept stationary. In contrast, the optical system may be revolved about the axis X with the table 8 being kept stationary.

Figure 4:
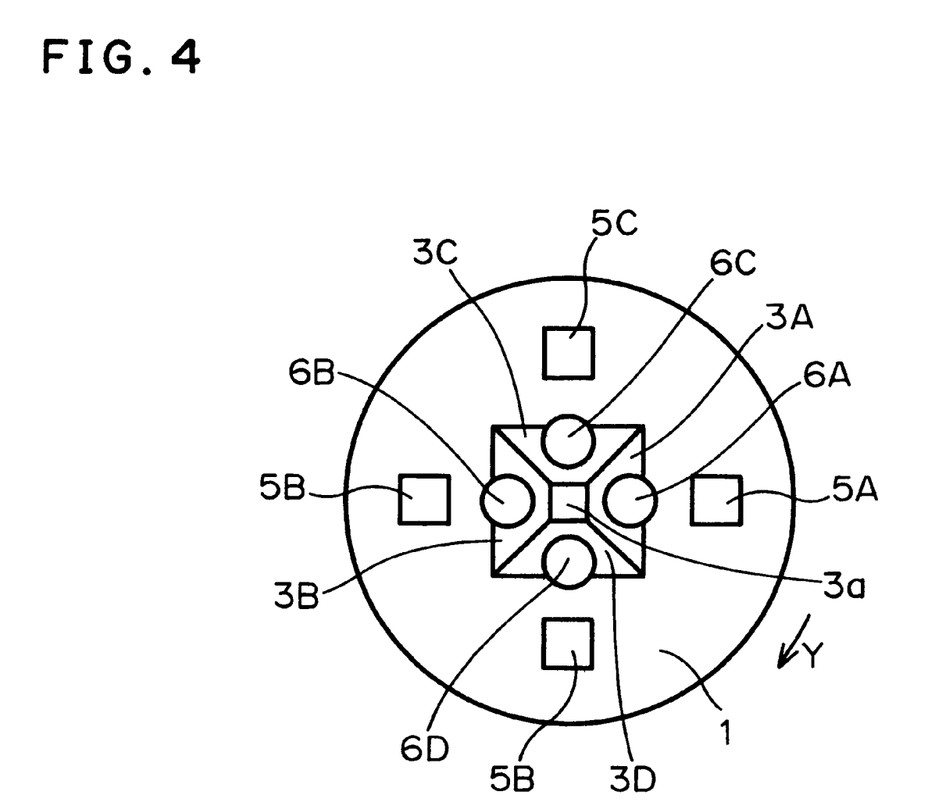
FIG. 4 is a top plan view illustrating an optical pick-up apparatus in accordance with the third embodiment of the present invention.

FIG. 4 illustrates an optical pick-up apparatus in accordance with the third embodiment of the present invention. This third embodiment is a variant of the first embodiment illustrated in FIG. 2. Though there are provided only two sets of a semiconductor laser, an associated inclined side surface and an optical system including an objective lens in the above mentioned first and second embodiments, three or more sets of a semiconductor laser, an associated inclined side surface and an optical system including an objective lens may be provided to an optical pick-up apparatus. The illustrated optical pick-up apparatus including four sets of a semiconductor laser, an associated inclined side surface and an optical system including an objective lens.

As illustrated in FIG. 4, a prism 3 is a square pole in shape with a summit thereof being horizontally cut off to thereby form a plan 3a. The prism 3 has four inclined side surfaces 3A, 3B, 3C and 3D. Semiconductor lasers 5A, 5B, 5C and 5D are disposed on a substrate 1 in facing relation to the inclined side surfaces 3A, 3B, 3C and 3D, respectively. Four optical systems are supported above the substrate 1 so that objective lenses 6A, 6B, 6C and 6D are located just above the inclined side surfaces 3A, 3B, 3C and 3D, respectively.

The optical pick-up apparatus in accordance with the third embodiment operates in the same way as that of the first embodiment. Whereas the first embodiment handles two laser beams having different wavelengths, the third embodiment handles four laser beams having different wavelengths.

Similarly to the second embodiment illustrated in FIG. 3, the substrate 1 may be mounted on a rotatable table (not illustrated), and may be rotated in a direction indicated with an arrow Y, in which case only one of the objective lenses 6A to 6D is supported just above the associated inclined side surface of the prism 3.

Figure 5:
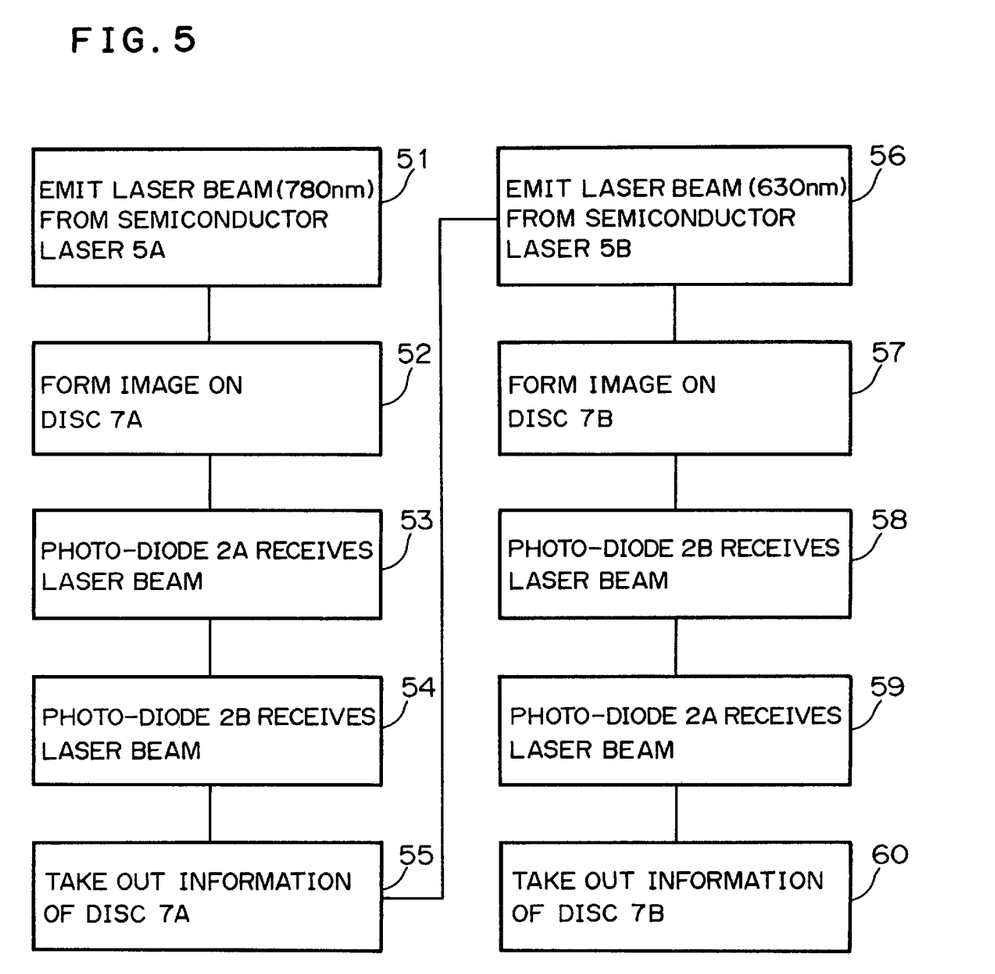
FIG. 5 is a block diagram illustrating respective steps of a method of fabricating an optical pick-up apparatus in accordance with an embodiment of the present invention.

FIG. 5 illustrates steps of a method of optical pick-up in accordance with the embodiment of the present invention. Respective steps are explained with reference to FIG. 2. In the first step 51, a laser beam having a wavelength of 780 nm band is emitted from the semiconductor laser 5A. The thus emitted laser beam is reflected at the inclined side surface 3A of the prism 3, passes through the objective lens 6A, and is focused on a recording surface of the optical disc medium 7A in step 52. Then, the laser beam reflected from the optical disc medium 7A passes again through the objective lens 6A and enters the prism 3 through the inclined side surface 3A. Then, the photo-diode 2A receives the laser beam in step 53. The laser beam reflected from the photo-diode 2A is again reflected at a top inner surface of the prism 3, and is received in the photo-diode 2B in step 54. Then, information stored in the optical disc medium 7A is taken out in step 55 by comparing the laser beams detected in the photo-diodes 2A and 2B.

Then, a laser beam having a wavelength of 630 nm band is emitted from the semiconductor laser 5B in step 56. The thus emitted laser beam is reflected at the inclined side surface 3B of the prism 3, passes through the objective lens 6B, and is focused on a recording surface of the optical disc medium 7B in step 57. Then, the laser beam reflected from the optical disc medium 7B passes again through the objective lens 6B and enters the prism 3 through the inclined side surface 3B. Then, the photo-diode 2B receives the laser beam in step 58. The laser beam reflected from the photo-diode 2B is again reflected at a top inner surface of the prism 3, and is received in the photo-diode 2A in step 59. Then, information stored in the optical disc medium 7B is taken out in step 60 by comparing the laser beams detected in the photo-diodes 2B and 2A.

In accordance with the above mentioned embodiment, similarly to the first embodiment illustrated in FIG. 2, the prism 3 and the photo-diodes 2A and 2B are shared by the two optical pick-up units comprising the semiconductor lasers 5A and 5B, which makes it possible to reduce parts in number, simplify an optical pick-up apparatus in structure, and fabricate an optical pick-up apparatus in a smaller size, comparing to a case wherein two optical pick-up apparatuses have to be fabricated separately.

When three or more sets of a semiconductor laser, an associated inclined side surface and an optical system including an objective lens are provided to an optical pick-up apparatus like the above mentioned third embodiment, the steps 51 to 55 or the steps 56 to 60 are repeated the same number times as the number of the sets.

Figure 6:
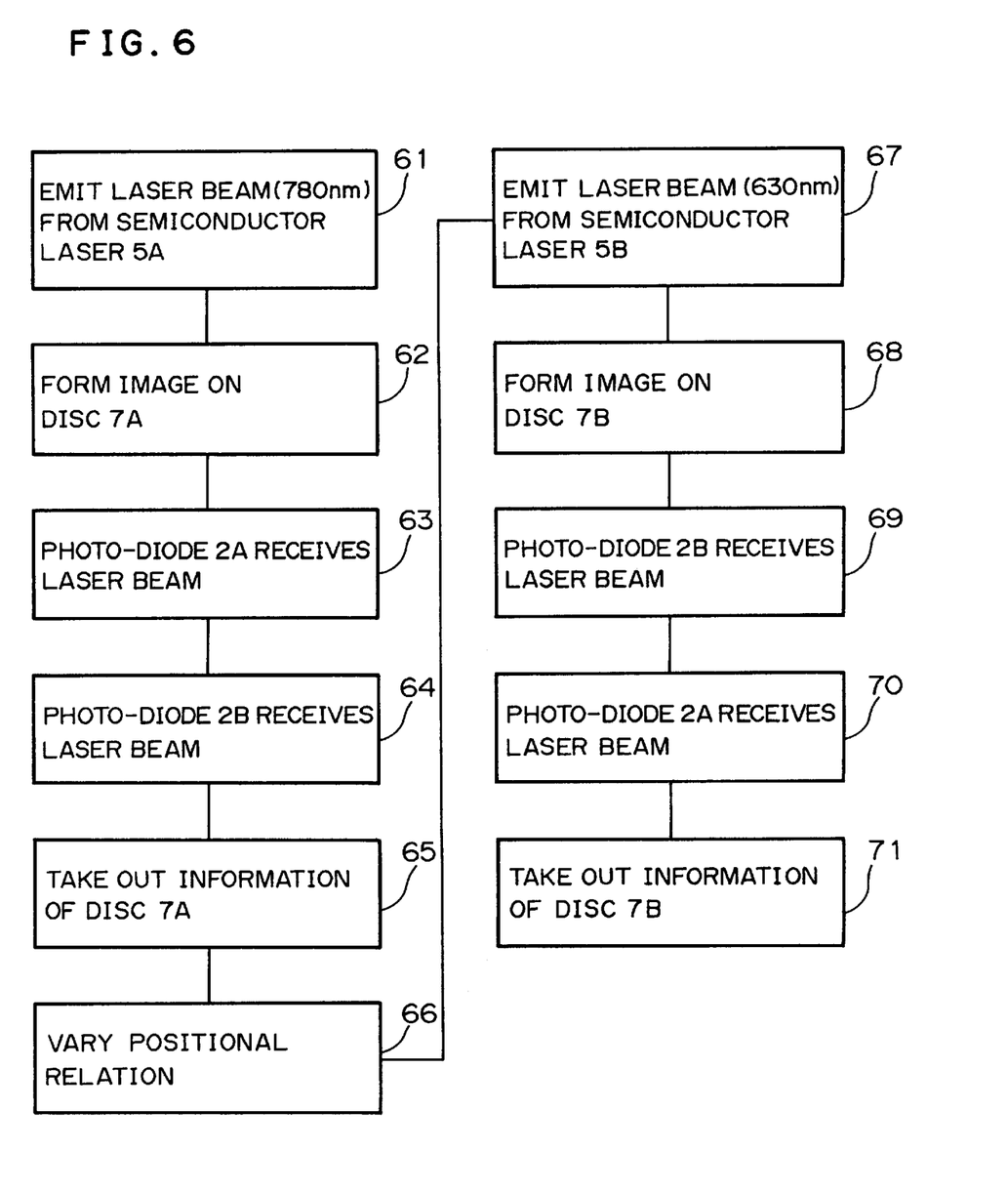
FIG. 6 is a block diagram illustrating respective steps of a method of fabricating an optical pick-up apparatus in accordance with another embodiment of the present invention.

FIG. 6 illustrates steps of a method of optical pick-up in accordance with another embodiment of the present invention. Respective steps are explained with reference to FIG. 3. In the first step 61, a laser beam having a wavelength of 780 nm band is emitted from the semiconductor laser 5A. The thus emitted laser beam is reflected at the inclined side surface 3A of the prism 3, passes through the objective lens 6, and is focused on a recording surface of the optical disc medium 7 in step 62. Then, the laser beam reflected from the optical disc medium 7 passes again through the objective lens 6 and enters the prism 3 through the inclined side surface 3A. Then, the photo-diode 2A receives the laser beam in step 63. The laser beam reflected from the photo-diode 2A is again reflected at a top inner surface of the prism 3, and is received in the photo-diode 2B in step 64. Then, information stored in the optical disc medium 7 is taken out in step 65 by comparing the laser beams detected in the photo-diodes 2A and 2B.

Then, a positional relationship between a set of the prism 3, the photo-diodes 2A and 2B and the semiconductor laser 5A and the objective lens 6 is varied in step 66. Specifically, the table 8 on which the prism 3, the photo-diodes 2A and 2B and the semiconductor laser 5A are mounted is rotated about the central axis X of the prism 3 by 180 degrees so that the inclined side surface 3B is located just below the objective lens 6, in which case the objective lens 6 is kept stationary. As an alternative, the objective lens 6 may be revolved round the axis X so that the objective lens 6 is located just above the inclined side surface 3B, in which case the table 8 and hence the substrate 1 are kept stationary.

Then, a laser beam having a wavelength of 630 nm band is emitted from the semiconductor laser 5B in step 67. The thus emitted laser beam is reflected at the inclined side surface 3B of the prism 3, passes through the objective lens 6, and is focused on a recording surface of the optical disc medium 7 in step 68. Then, the laser beam reflected from the optical disc medium 7 passes again through the objective lens 6 and enters the prism 3 through the inclined side surface 3B. Then, the photo-diode 2B receives the laser beam in step 69. The laser beam reflected from the photo-diode 2B is again reflected at a top inner surface of the prism 3, and is received in the photo-diode 2A in step 70. Then, information stored in the optical disc medium 7 is taken out in step 71 by comparing the laser beams detected in the photo-diodes 2B and 2A.

In accordance with the above mentioned embodiment, similarly to the second embodiment illustrated in FIG. 3, the optical system including the objective lens 6 as well as the prism 3 and the photo-diodes 2A and 2B are shared by the two optical pick-up units comprising the semiconductor lasers 5A and 5B, which makes it possible to reduce parts in number in comparison with the method illustrated in FIG. 5.

When three or more sets of a semiconductor laser, an associated inclined side surface and an optical system including an objective lens are provided to an optical pick-up apparatus like the above mentioned third embodiment, the steps 61 to 66 are repeated the same number times as the number of the sets.

As mentioned so far in connection with the preferred embodiments, an optical pick-up apparatus in accordance with the present invention is provided with two or more light emitting devices or semiconductor lasers emitting laser beams having different wavelengths, and further with a prism having inclined side surfaces located in facing relation to the light emitting devices. This structure makes it possible that two or more optical pick-up units including the light emitting devices can commonly use one light receiving device for processing received laser beams. As a result, it is possible to reduce the number of parts comparing to a case where two or more optical pick-up apparatuses have to be separately fabricated, ensuring that an optical pick-up apparatus can be fabricated in lower costs and that a package for an optical head including the optical pick-up apparatus in accordance with the present invention can be fabricated in a smaller size.

It is also possible to reduce the number of an objective lens by designing a set of a semiconductor laser, a prism and a light receiving device and an optical system including an objective lens to be variable in position relative to each other. This ensures that optical disc mediums having different specification can be reproduced by a common optical pick-up apparatus. Accordingly, both existing disc mediums and newly developed disc mediums such as DVD can be handled with a common optical pick-up apparatus.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 8-225279 filed on Aug. 27, 1996 including specification, claims, drawings and summary is incorporated herein by reference in its entirety.

What is claimed is:

1. An optical pick-up apparatus comprising:
   (a) a plurality of light emitting devices emitting laser beams having different wavelengths;
   (b) a prism located on a substrate having inclined reflective surfaces of a same number as that of said light emitting devices for reflecting said laser beams;
   (c) a same number of optical systems for image-formation as that of said light emitting devices, each of said optical systems being disposed above each of said inclined reflective surfaces of said prism, each of said optical systems focusing said laser beams reflected at said inclined reflective surfaces on an optical disk medium and transmitting therethrough said laser beams reflected from said optical disk medium; and
   (d) at least one light receiving device disposed in said substrate receiving all of said laser beams reflected from said optical disk medium and transmitting through both said optical systems and said inclined reflective surfaces, wherein a second light receiving device receives said reflected laser beams from a first light receiving source.

2. The optical pick-up apparatus as set forth in claim 1, wherein there are two light emitting devices.

3. The optical pick-up apparatus as set forth in claim 1, wherein said inclined reflective surfaces have 45 degrees inclination.

4. The optical pick-up apparatus as set forth in claim 1, wherein said inclined reflective surfaces are provided by a single prism.

5. The optical pick-up apparatus as set forth in claim 2, wherein said inclined reflective surfaces are provided by a prism having a trapezoidal longitudinal cross-section.

6. The optical pick-up apparatus as set forth in claim 4, wherein said optical pick-up apparatus has first and second light receiving devices, said first light receiving device receiving laser beams transmitting through said inclined reflective surfaces, and said second light receiving device receiving laser beams reflected from said first light receiving device and further reflected at a top inner surface of said prism.

7. The optical pick-up apparatus as set forth in claim 1, wherein one of said light emitting devices emits laser beam having a wavelength for a digital video disc and another one of said light emitting devices emits laser beam having a wavelength for a disc other than a digital video disc.

8. An optical pick-up apparatus comprising:
   (a) an optical integrated circuit substrate;
   (b) at least one photo-diode formed at a surface of said substrate;
   (c) a prism mounted on said substrate above said photo-diode, said prism having a plurality of inclined reflective surfaces;
   (d) semiconductor laser beam emitting devices by the same number of that of said inclined reflective surfaces, said semiconductor laser beam emitting devices emitting laser beams having different wavelengths and being disposed in facing relation with said inclined reflective surfaces; and
   (e) optical systems for image-formation by the same number of that of said inclined reflective surfaces, disposed above said inclined reflective surfaces;
   laser beams emitted from said semiconductor laser beam emitting devices being reflected at said inclined reflective surfaces of said prism and focused on an optical disc medium by said optical systems, laser beams reflected from said optical disc medium transmitting through said optical systems, entering said prism through said inclined reflective surfaces, and being received in said photo-diode.

9. The optical pick-up apparatus as set forth in claim 8, wherein said optical pick-up apparatus has two semiconductor laser beam emitting devices.

10. The optical pick-up apparatus as set forth in claim 8, wherein said inclined reflective surfaces have 45 degrees inclination.

11. The optical pick-up apparatus as set forth in claim 8, wherein said inclined reflective surfaces are provided by a prism having a trapezoidal longitudinal cross-section.

12. The optical pick-up apparatus as set forth in claim 9, wherein said optical pick-up apparatus has first and second photo-diodes, said first photo-diode receiving laser beams transmitting through said inclined reflective surfaces, and said second photo-diode receiving laser beams reflected from said first photo-diode and further reflected at a top inner surface of said prism.

13. The optical pick-up apparatus as set forth in claim 8, wherein one of said semiconductor laser beam emitting devices emits laser beam having a wavelength for a digital video disc and another one of said semiconductor laser beam emitting devices emits laser beam having a wavelength for a disc other than a digital video disc.

14. An optical pick-up apparatus comprising:
(a) an optical integrated circuit substrate;
(b) at least one light receiving device formed at a surface of said substrate;
(c) a prism mounted on said substrate above said light receiving device, said prism having a plurality of inclined reflective surfaces and having a central axis about which said inclined reflective surfaces are disposed in symmetry;
(d) semiconductor laser beam emitting devices by the same number of that of said inclined reflective surfaces, said semiconductor laser beam emitting devices emitting laser beams having different wavelengths and being disposed in facing relation with said inclined reflective surfaces;
(e) a single optical system for image-formation disposed above one of said inclined reflective surfaces; and
(f) means for varying said light receiving device, said prism and said semiconductor laser beam emitting devices in position relative to said optical system so that said laser beams reflected at said inclined reflective surfaces are directed toward said single optical system,
laser beams emitted from said semiconductor laser beam emitting devices being reflected at said inclined reflective surfaces of said prism and focused on an optical disc medium by said optical system,
laser beams reflected from said optical disc medium transmitting through said optical system, entering said prism through said inclined reflective surfaces, and being received in said light receiving device.

15. The optical pick-up apparatus as set forth in claim 14, wherein said light receiving device, said prism and said semiconductor laser beam emitting devices, and said optical system are rotatable relative to each other.

16. The optical pick-up apparatus as set forth in claim 15, wherein said optical integrated circuit substrate is rotatable about said central axis of said prism.

17. The optical pick-up apparatus as set forth in claim 15, wherein said optical system is designed to revolve round said central axis of said prism.

18. The optical pick-up apparatus as set forth in claim 14, wherein said inclined reflective surfaces have 45 degrees inclination.

19. The optical pick-up apparatus as set forth in claim 14, wherein said optical pick-up apparatus has first and second light receiving devices, said first light receiving device receiving laser beams transmitting through said inclined reflective surfaces, and said second light receiving device receiving laser beams reflected from said first light receiving device and further reflected at a top inner surface of said prism.

20. The optical pick-up apparatus as set forth in claim 14, wherein one of said semiconductor laser beam emitting devices emits laser beam having a wavelength for a digital video disc and another one of said semiconductor laser beam emitting devices emits laser beam having a wavelength for a disc other than a digital video disc.

21. An optical pick-up apparatus comprising:
(a) a plurality of light emitting devices emitting laser beams having different wavelengths;
(b) inclined reflective surfaces by the same number as that of said light emitting devices for reflecting said laser beams;
(c) a single optical system for image-formation disposed above one of said inclined reflective surfaces, said optical system focusing said laser beams reflected from said inclined reflective surfaces on an optical disk medium and transmitting therethrough said laser beams reflected from said optical disk medium;
(d) at least one light receiving device receivable all of said laser beams reflected from said optical disk medium and transmitting through both said optical system and said inclined reflective surfaces; and
(e) means for varying said light emitting device, said inclined reflective surfaces and said light receiving device in position relative to said optical system so that said laser beams reflected at said inclined reflective surfaces are directed toward said single optical system.

22. The optical pick-up apparatus as set forth in claim 21, wherein said light emitting device, said inclined reflective surfaces and said light receiving device, and said optical system are rotatable relative to each other.

23. The optical pick-up apparatus as set forth in claim 22, wherein said optical integrated circuit substrate is rotatable about said central axis of said prism.

24. The optical pick-up apparatus as set forth in claim 22, wherein said optical system is designed to revolve round said central axis of said prism.

25. The optical pick-up apparatus as set forth in claim 23, further comprising means for controlling rotation of said substrate.

26. The optical pick-up apparatus as set forth in claim 24, further comprising means for controlling revolution of said optical system.

27. The optical pick-up apparatus as set forth in claim 21, wherein said inclined reflective surfaces have 45 degrees inclination.

28. The optical pick-up apparatus as set forth in claim 21, wherein said optical pick-up apparatus has first and second light receiving devices, said first light receiving device receiving laser beams transmitting through said inclined reflective surfaces, and said second light receiving device receiving laser beams reflected from said first light receiving device and further reflected at a top inner surface of said prism.

29. The optical pick-up apparatus as set forth in claim 21, wherein one of said light emitting devices emits laser beam having a wavelength for a digital video disc and another one of said light emitting devices emits laser beam having a wavelength for a disc other than a digital video disc.

30. A method of optical pick-up, comprising the steps of:
   (a) emitting a laser beam from a light emitting device;
   (b) forming an image on an optical disk medium by reflecting said laser beam at a reflective surface of a prism mounted on a substrate;
   (c) receiving said laser beam reflected from said optical disc medium at a first common light receiving device;
   (d) receiving said laser beam reflected from said first common light receiving device at a second common light receiving device; and
   (e) repeating said steps (a) to (d) with different laser beams emitted from different light emitting devices that have different wavelengths, and wherein said different laser beams are reflected at different reflective surfaces of said prism.

31. The method as set forth in claim 30, wherein said different reflective surfaces have 45 degrees inclination.

32. The method as set forth in claim 30, wherein said different reflective surfaces are provided by a single prism.

33. The method as set forth in claim 30, wherein said laser beam reflected from said optical disc medium is received at a first light receiving device, and wherein laser beam reflected from said first light receiving device is reflected at a reflective surface and is received at a second light receiving device.

34. A method of optical pick-up, comprising the steps of:
   (a) emitting a laser beam from a light emitting device;
   (b) forming an image on an optical disc medium by reflecting said laser beam at a reflective surface and transmitting said laser beam through an optical system for image-formation;
   (c) receiving said laser beam reflected from said optical disc medium at at least one common light receiving device;
   (d) varying a positional relationship among said light emitting device, said reflective surface, said light receiving device and said optical system so that a set of another light emitting device, reflective surface and light receiving device is associated with said optical system; and
   (e) repeating said steps (a) to (d) wherein laser beams are emitted from different light emitting devices, have different wavelengths, and are reflected at different reflective surfaces.

35. The method as set forth in claim 34, wherein said positional relationship is varied in said step (d) by rotating said light emitting device, said reflective surface and said light receiving device, and said optical system relative to each other.

36. The method as set forth in claim 35, wherein said light emitting device, said reflective surface and said light receiving device are rotated in said step (d) about a central axis of said different reflective surfaces.

37. The method as set forth in claim 35, wherein said optical system is designed to revolve round a central axis of said different reflective surfaces in said step (d).

38. The method as set forth in claim 34, wherein said different reflective surfaces have 45 degrees inclination.

39. The method as set forth in claim 34, wherein said different reflective surfaces are provided by a single prism.

40. The method as set forth in claim 34, wherein said laser beam reflected from said optical disc medium is received at a first light receiving device, and wherein laser beam reflected from said first light receiving device is reflected at a reflection.

41. An optical pick-up apparatus comprising:
   (a) a plurality of light emitting devices emitting laser beams having different wavelengths;
   (b) a prism located on a substrate having inclined reflective surfaces of a same number as that of said light emitting devices for reflecting said laser beams, and a top inner reflective surface;
   (c) a same number of optic systems for image-formation as that of said light emitting devices, each of said optical systems being disposed above each of said inclined reflective surfaces of said prism, each of said optical systems focusing said laser beams reflected at said inclined reflective surfaces on an optical disk medium and transmitting therethrough said laser beams reflected from said optical disk medium; and
   (d) at least two light receiving devices disposed in said substrate receiving all of said laser beams reflected from said optical disk medium and transmitting through both said optical systems and said inclined reflective surfaces, wherein a second light receiving device receives said laser beams reflected from a first light receiving source after said laser beams are reflected from said top inner reflective surface.

42. A method of optical pick-up, comprising the steps of:
   (a) emitting a laser beam from a light emitting device;
   (b) forming an image on an optical disk medium by reflecting said laser beam at a reflective surface of a prism mounted on a substrate;
   (c) receiving said laser beam reflected from said optical disc medium at a first common light receiving device;
   (d) receiving said laser beam reflected from said first common light receiving device at a top inner surface of said prism;
   (e) receiving said laser beam reflected from said top inner surface at a second common light receiving device; and
   (f) repeating said steps (a) to (e) with different laser beams emitted from different light emitting devices that have different wavelengths, and wherein said different laser beams are reflected at different said reflective surfaces of said prism.

* * * * *